March 11, 1969 R. E. BAUER 3,432,045
APPARATUS FOR ARRANGING AND PLACING
GROUPS OF ARTICLES IN SHELVES
Filed March 14, 1966

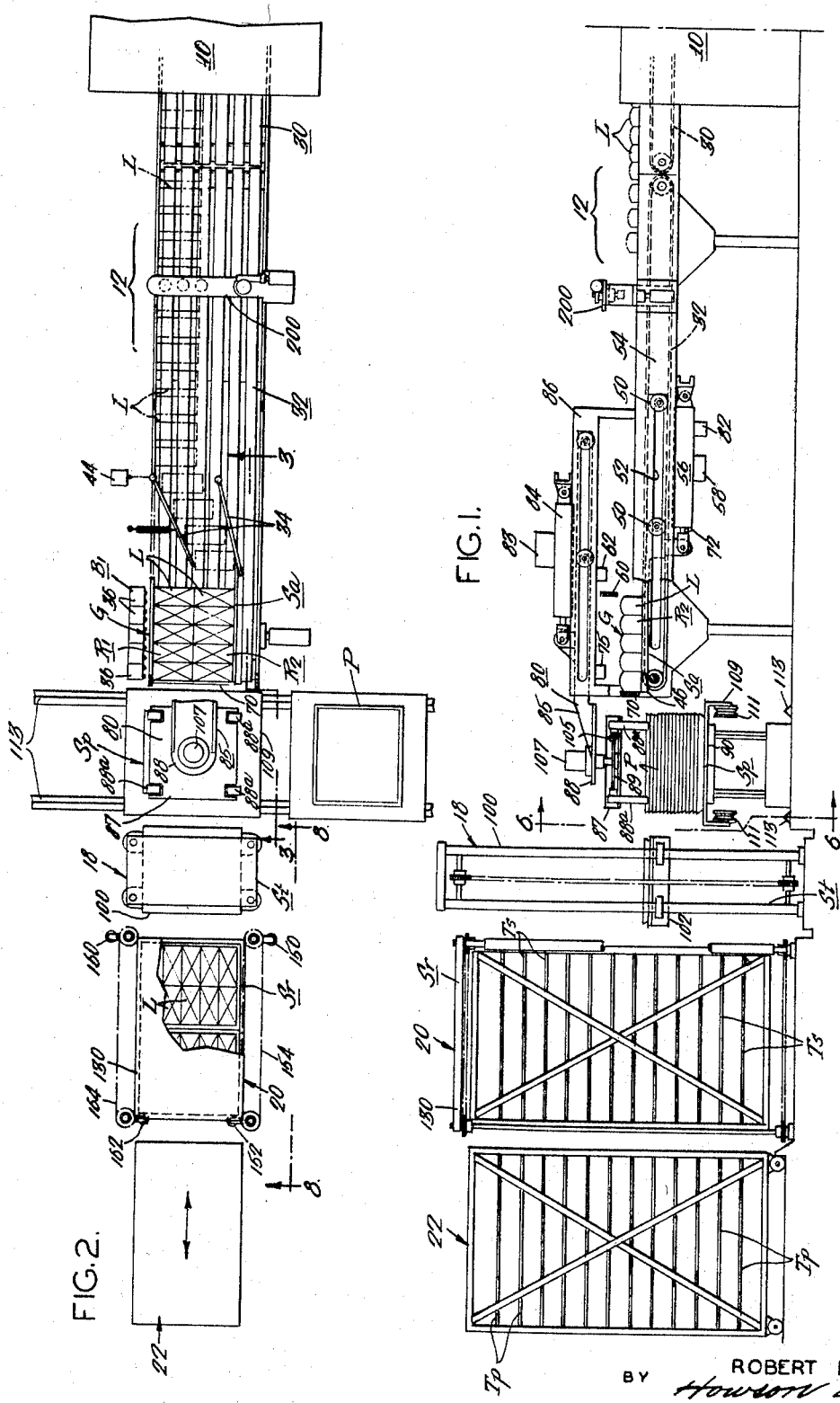

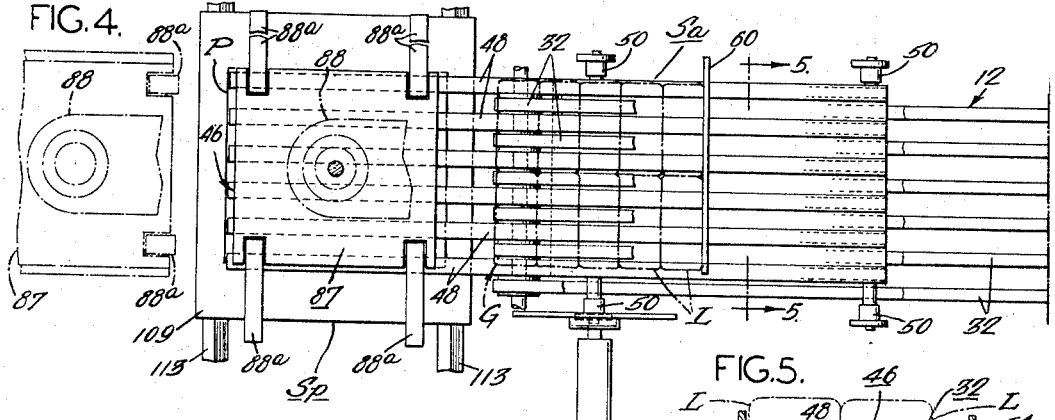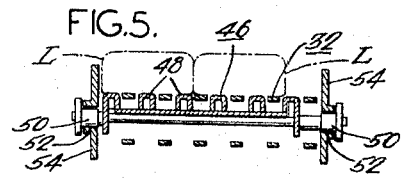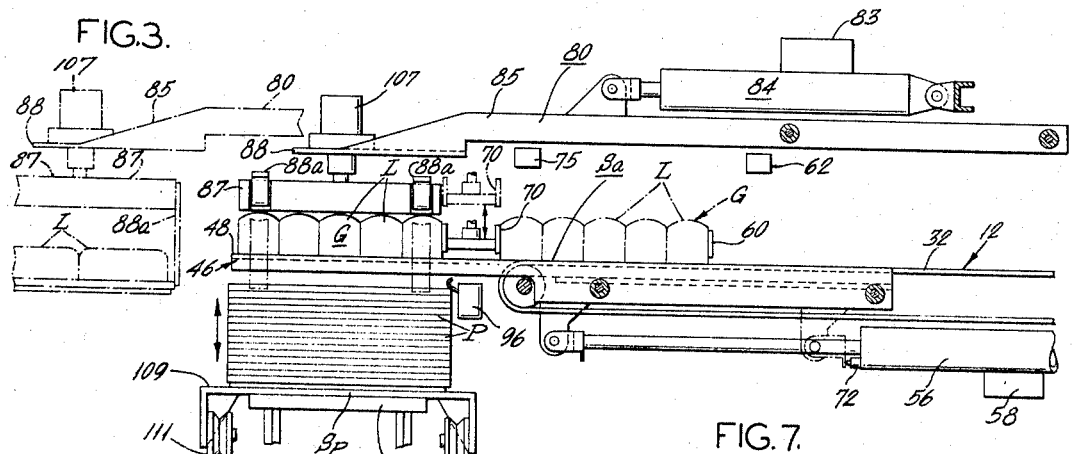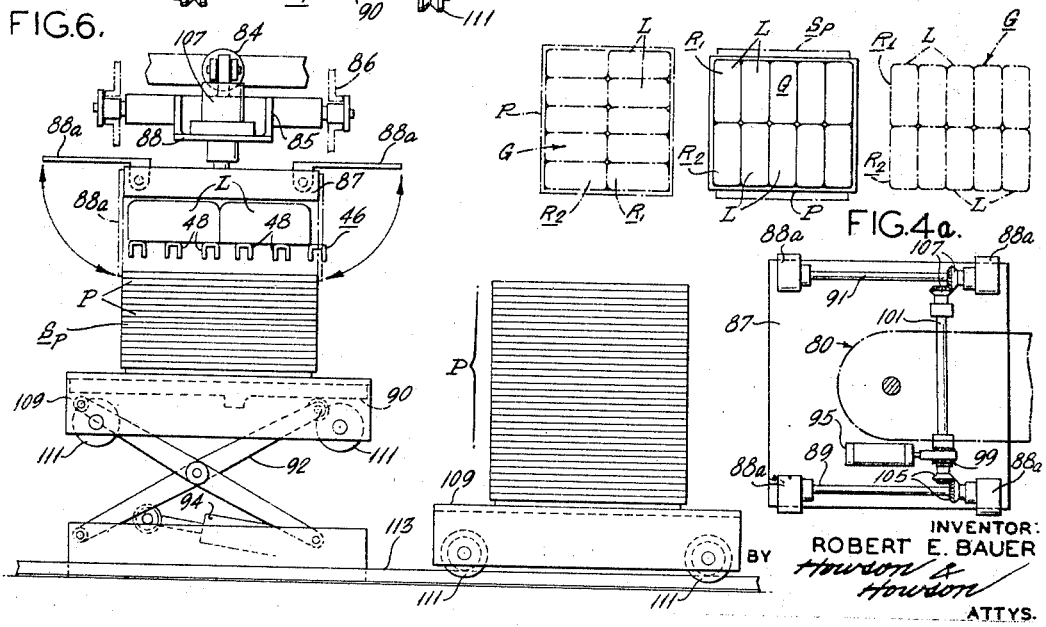

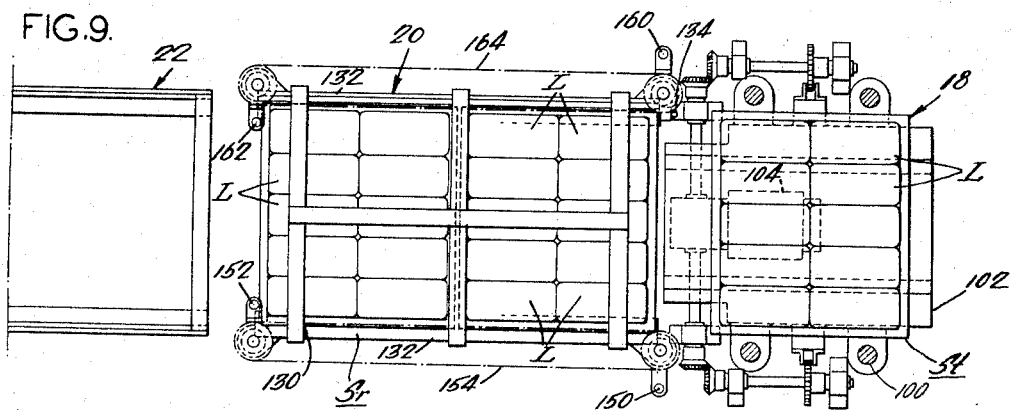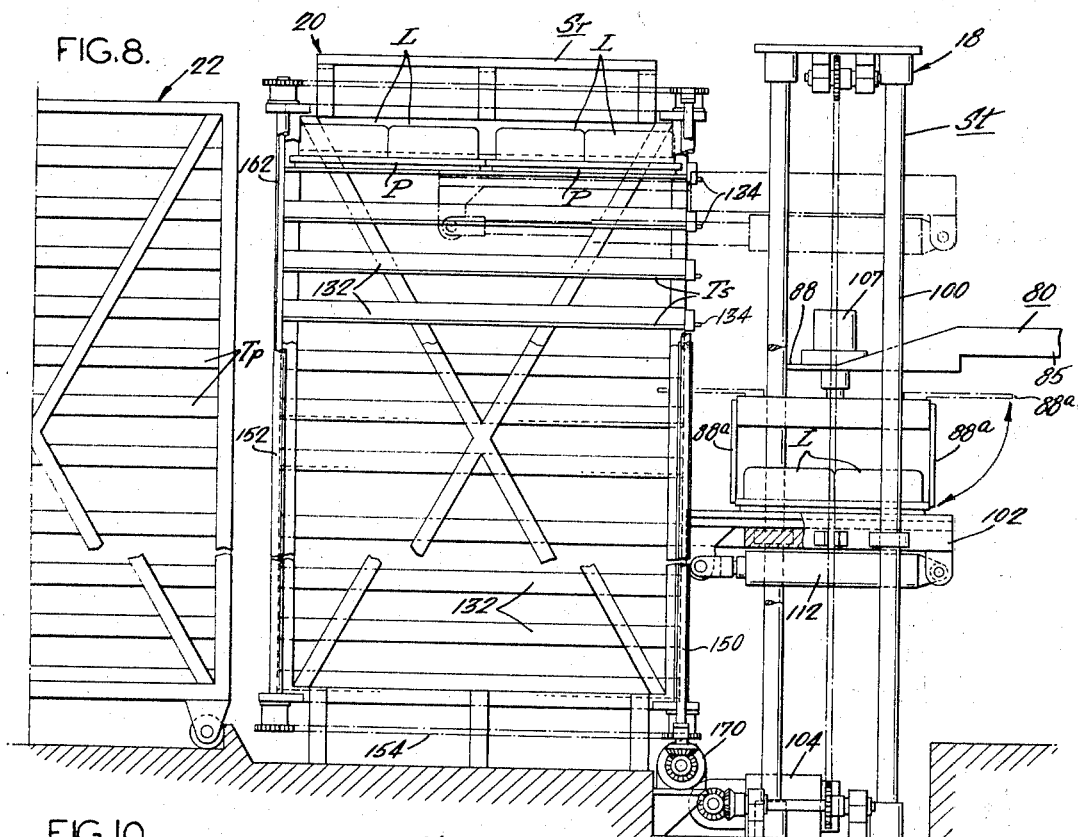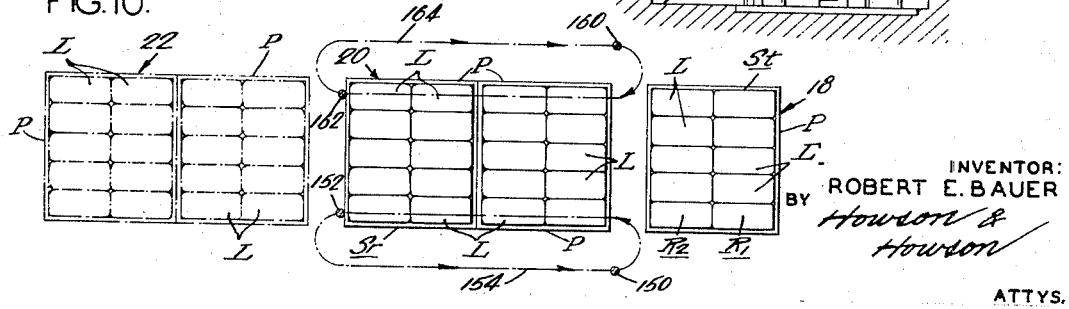

INVENTOR:
ROBERT E. BAUER
BY Howson & Howson
ATTYS.

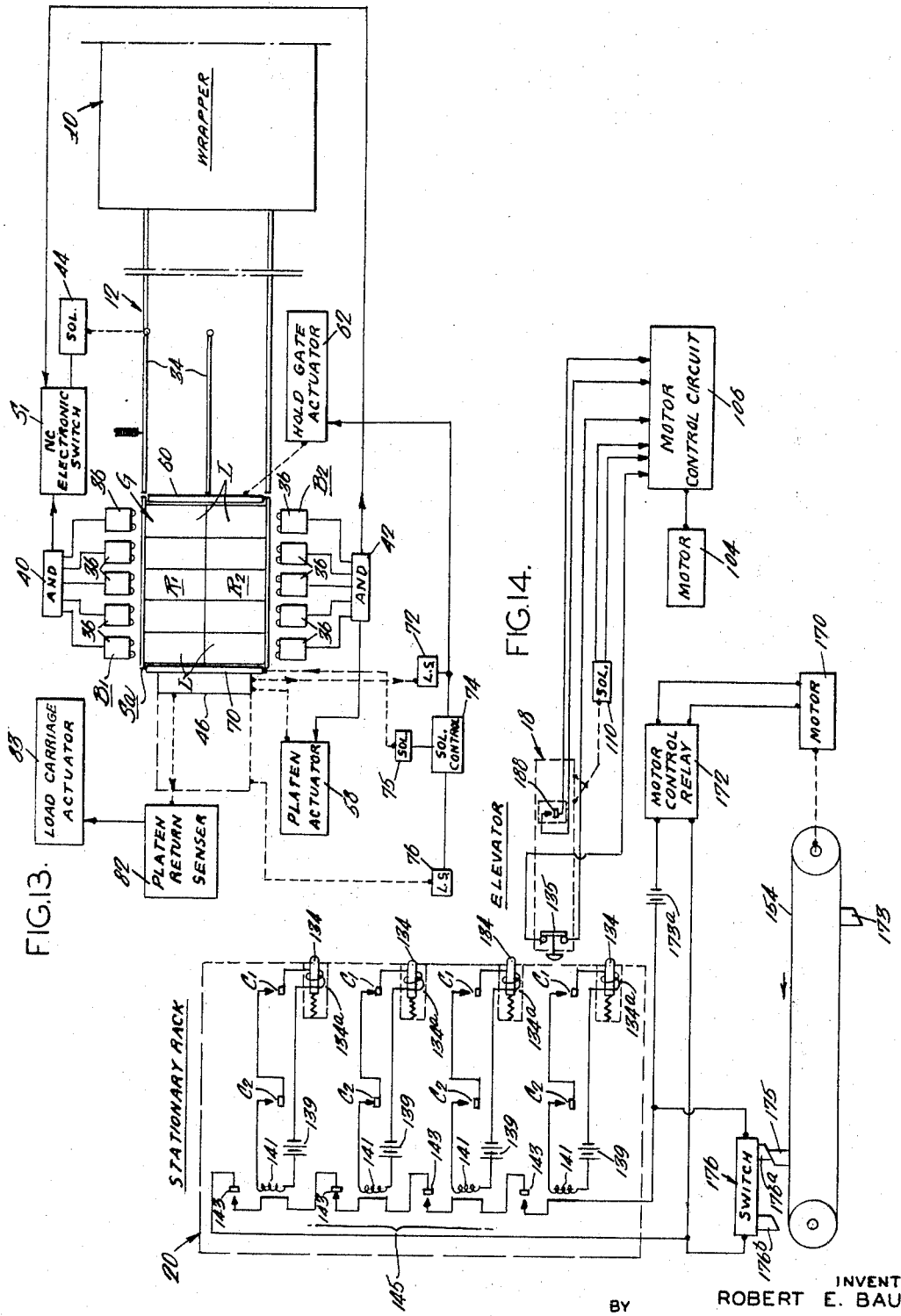

United States Patent Office 3,432,045
Patented Mar. 11, 1969

3,432,045
APPARATUS FOR ARRANGING AND PLACING
GROUPS OF ARTICLES IN SHELVES
Robert E. Bauer, 8105 Flourtown Ave.,
Wyndmoor, Pa. 19118
Filed Mar. 14, 1966, Ser. No. 533,902
U.S. Cl. 214—16.4      8 Claims
Int. Cl. B66c 19/00; B66d 1/00

ABSTRACT OF THE DISCLOSURE

Apparatus for handling articles such as loaves of bread discharged from the discharge conveyor of an automatic packaging machine comprising an accumulator station including a movable platen, orientation means for directing loaves on to the platen in groups of a given number and orientation, a pallet station adjacent the accumulator station including at least one pallet, means for cycling the platen to deliver a group of loaves to said one pallet at the pallet station, a transfer elevator, a stationary rack adjacent the transfer elevator, transfer means for transferring a filled pallet to the transfer elevator, said transfer elevator including sensing means whereby a filled pallet is delivered to an empty tier of the stationary rack, a portable rack and clearing means for transferring all of the filled pallets from the stationary rack to the portable rack when all of the tiers have been filled.

---

The present invention relates to a new and improved article handling system and method and more particularly is directed to a system and method for handling baked goods, for example, loaves of bread.

A substantial portion of the bread made by bakeries is wrapped after baking for delivery to the user. Usually automatic wrapping machines are employed for this purpose. At present, an operator stationed at the discharge conveyor of each wrapping machine takes the wrapped loaves from the conveyor and places them on a pallet in a predetermined pattern to fill the pallet. The filled pallets are then placed in the tier of a multi-tier portable rack. After the rack is filled, it is moved to a designated area of the bakery for loading of the bread on to trucks.

It has been found that this method of handling the wrapped loaves is comparatively expensive since an operator is required for each wrapping machine while it is operating and that if the operator has to leave the machine, a replacement is required or the machine has to be shut down. Furthermore, even though the operator's job does not require a high degree of skill, it has been found that some operators cannot handle the output of the machine continuously and accordingly, even skilled operators find it necessary to shut down the machine from time to time to permit the operator to replace pallets when the supply is exhausted, remove filled racks, etc.

The present invention is directed to a completely automated method and system for handling wrapped loaves of bread for example, which completely eliminates the need and expense of an operator at discharge end of the wrapping machine. To this end, in accordance with one embodiment of the invention, loaves of bread discharged from the wrapping machine are oriented or grouped in a predetermined number and arrangement to fill a single pallet on a movable platen at an accumulator station. The platen containing the group of loaves is then cycled to discharge the group to carrier means, in the present instance, an empty pallet of a stack disposed adjacent the end of the conveyor at a pallet station. The filled pallet is then transferred to the empty tier of a stationary rack. In the present instance, the pallet is transferred to an elevator at a transfer station, the pallet being oriented during delivery so that it may be eventually stacked in a conventional rack. The elevator is positioned in registry with the open end of a stationary multi-tiered rack and operates automatically to discharge filled pallets to empty tiers of the rack and then return to its starting position to receive another filled pallet. This cycle continues automatically and when the tiers of the stationary rack have been filled, all of the pallets are then automatically discharged from the stationary rack to a portable rack aligned with the stationary rack. This portable rack may be then delivered by operators to an area of the bakery for loading of the filled pallets on to a truck.

A control system including various interrelated electrical and hydraulic components is provided to effect the continuous cyclical operation of the article handling system of the present invention whereby the handling of loaves of bread in the manner discussed above is completely automated. Thus, the present invention obviates the need for operators heretofore used in conjunction with automatic wrapping machines for loaves of bread and hence, eliminates the disadvantages noted above of the prior systems such as expense, shut down of the wrapping machine for various reasons and inability of the operators to handle the capacity of the wrapping machines.

With the foregoing in mind, an object of the present invention is to provide automatic handling system and apparatus particularly adapted for handling wrapped loaves of baked goods from a wrapping machine and storing them automatically in storage means such as a rack for transport to another location.

Another object of the present invention is to provide an article handling system and apparatus of the above type which is reliable in operation and which functions continuously to handle articles delivered from the discharge conveyor of an automatic wrapping machine.

These and other objects of the present invention and the various details thereof are hereinafter more fully set forth with reference to the accompanying drawings, wherein:

FIG. 1 is a side elevational view showing article handling system and apparatus in accordance with the present invention;

FIG. 2 is a plan view of the system and apparatus shown in FIG. 1;

FIG. 3 is an enlarged fragmentary view taken on lines 3—3 of FIG. 2 showing the elevator load carriage;

FIG. 4 is an enlarged plan view of the accumulator and pallet loading stations of the system;

FIG. 4a is a fragmentary plan view of the load carriage platform;

FIG. 5 is an enlarged sectional view taken on lines 5—5 of FIG. 4;

FIG. 6 is an enlarged sectional view showing the pallet section taken on line 6—6 of FIG. 1;

FIG. 7 is a schematic arrangement showing the grouped articles at various stations of the system;

FIG. 8 is an enlarged view of the stationary rack loading station and transfer elevator taken on line 8—8 of FIG. 2;

FIG. 9 is a plan view of the station shown in FIG. 8;

FIG. 10 is a schematic illustration showing movement of filled pallets from the transfer station to the portable rack;

FIGS. 13 and 14 are schematic views of the various control components for the article handling system of the present invention.

Figure 11:
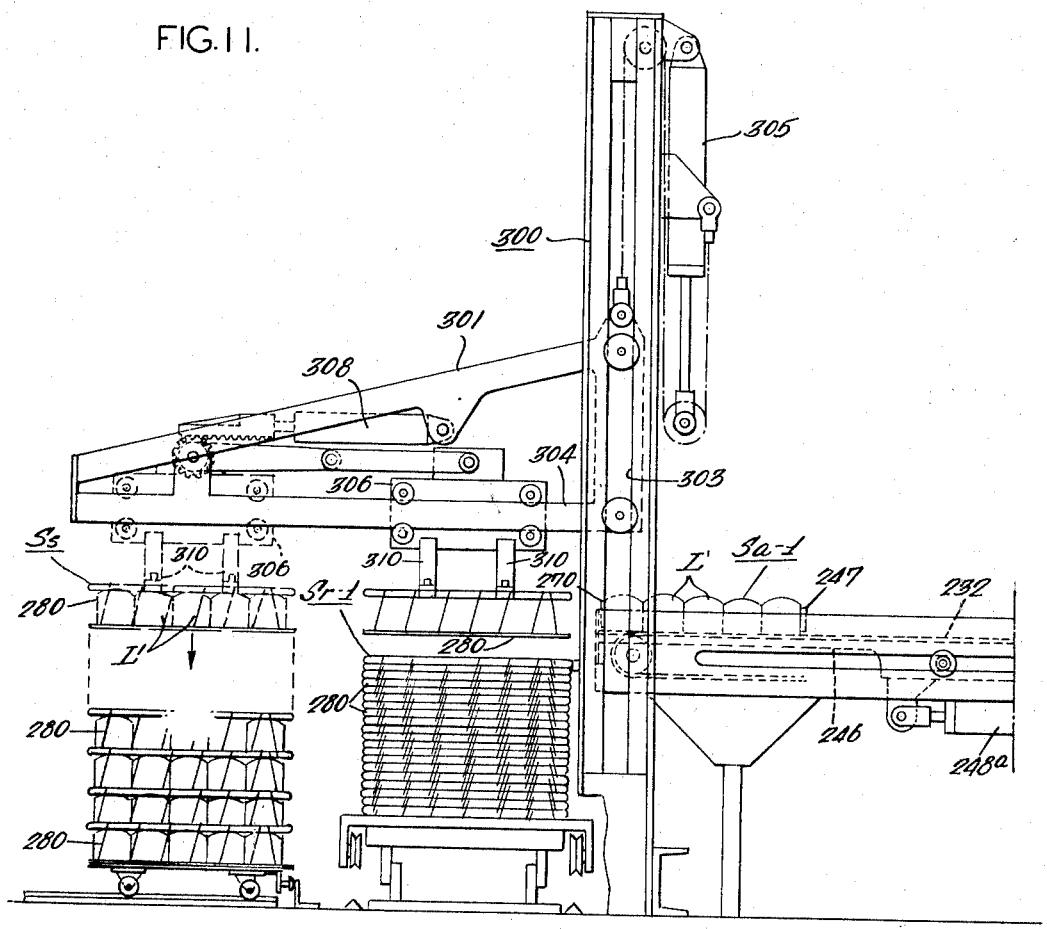
FIG. 11 is a side elevational view of a modified form of the article handling system of the present invention.

Considering now the broad components of the system in terms of function and with particular reference to FIGS. 1 and 2, articles, in the present instance loaves of baked bread, are wrapped in an automatic wrapping machine 10 and exit from the wrapping machine 10 to discharge conveyor means 12 for moving the loaves along a predetermined path. Means is provided along the conveyor in the path of movement of the loaves for orienting a predetermined number of the loaves L into a group G at an accumulator station $S_a$ adjacent the end of the discharge conveyor means 12. The group of loaves G is then transferred to an empty pallet P at a pallet station $S_p$ and thereafter the loaded pallet P is translated and rotated to an elevator 18 at a pallet transfer station $S_t$. The elevator 18 is positioned in registry with the open side of a multi-tiered stationary rack 20 and is operable to deliver loaded pallets P to empty tiers of the stationary rack 20 and then to return automatically to its starting position to receive another loaded pallet P. When the stationary rack 20 has been filled to capacity, all of the loaded pallets are discharged from the tiers of the stationary rack 20 to a portable rack 22 disposed adjacent the stationary rack. When the portable rack 20 has been loaded, an operator removes it and replaces it with an empty portable rack.

The system described above is a continuously operating one wherein the loaves L on the discharge conveyor means are continuously being oriented into groups G and after each formation of a group, the group is transferred to the pallet, the transfer elevator, and then an open tier in the rack 20.

Suitable sequence control means including various electrical and hydraulic components is provided to effect a continuous cylical operation and synchronized and timed operation of the system to continuously orient loaves into groups G at the accumulator station $S_a$, transfer the groups G to empty pallets at the pallet loading station $S_p$, and deliver the loaded pallets P to a portable rack through the transfer station and stationary rack 20.

Considering now the system and apparatus in more detail, the conveyor means 12 which are in the form of a plurality of spaced apart belts suitably mounted for movement in an endless path, includes a first discharge conveyor section 30 from the wrapping machine 10 which moves the loaves L at a predetermined linear speed and a second discharge conveyor section 32 aligned with the conveyor 30 forming a continuation thereof which moves the loaves L at a faster linear speed so that the loaves L are spaced apart slightly when they are transferred from the conveyor section 30 to the conveyor section 32 (see FIGS. 1 and 2). The loaves L are formed into a group G consisting of two rows $R_1$ and $R_2$ of five loaves each of the accumulator station $S_a$ by means including a pair of pivotally mounted spaced apart diverter bars 34 which overlie the conveyor section 32 and are disposed in the path of movement of the loaves L. These diverter bars 34 are normally spring biased to a first limit position parallel to the direction of movement of the loaves L to direct the loaves to the row $R_1$ and are actuatable to a second limit position angularly disposed to the path of movement of the loaves to direct loaves L to the row $R_2$. Actuation of the diverter bars 34 between limit positions is controlled by sensing means at the accumulator station $S_a$ which detects when the selected number of loaves, in the present instance, five fills each row $R_1$ and $R_2$. The sensing means is in the form of first and second banks $B_1$ and $B_2$ of photo-sensing devices 36 on opposite sides of the conveyor 32 at the accumulator station $S_a$. The banks $B_1$ and $B_2$ are connected to AND circuits 40 and 42 respectively (see FIG. 13). The output of the AND circuit 40 is supplied to a solenoid actuator 44 for the diverter bars by way of a normally closed electronic switch $S_1$ and the output of AND circuit 42 is supplied to the control element of normally closed electronic switch $S_1$. By this arrangement, when the accumulator station $S_a$ is empty, the switch $S_1$ is closed and the solenoid actuator 44 is deenergized since there is no output signal from AND circuit 40 whereby the diverter bars 34 are biased to their normal first limit position (solid lines in FIG. 1).

Now when five loaves fill the row $R_1$, the AND circuit 40 is actuated to produce an output signal passing through the switch $S_1$ thereby to energize solenoid actuator 44 and move diverter bars 34 to their second limit position to direct loaves to row $R_2$. When the row $R_2$ has been filled with five loaves L, AND circuit 42 is actuated producing an output signal to open switch $S_1$ and deenergize solenoid actuator 44 whereby diverter bars are returned to their normal first limit position.

The group of loaves at the accumulator station is supported on a platen 46 which is normally disposed at a rest or retracted position (FIG. 2) during loading and orienting of the loaves to form the group G and which is adapted to be cycled to an extended position to deposit the group G on a pallet P at the pallet station $S_p$. The platen 46 as best illustrated in FIGS. 5 and 6 comprises a plurality of elongated rails or runners 48 disposed between the belts of the conveyor and projecting slightly above the belts to support the loaves out of engagement with the conveyor belts at the accumulator station $S_a$.

The platen 46 carries rollers 50 which engage in a trackway 52 in the conveyor framework 54 for cycling between retracted and extended limit positions. The platen 46 is actuated between limit positions by means of a platen actuator 55 including a hydraulic piston-cylinder actuator 56 and solenoid control valve 58. The platen 46 in the present instance, is adapted for movement from the retracted positions when a group G of loaves has been formed at the accumulator station $S_a$. Cycling of the actuator 55 is controlled by a signal from the AND circuit 42 supplied to solenoid control valve 58 when a group G is formed at the accumulator station $S_a$.

Flow or movement of loaves L to the accumulator station $S_a$ is cut off during cycling of the platen 46 by means of a holdgate 60 at the entrance end of the accumulator station $S_a$. This holdgate 60 may be normally spring biased to a raised position (see FIG. 1) permitting flow of loaves to the accumulator station $S_a$ during loading and a lowered position (see FIG. 3) blocking movement thereto during transfer of a group G to the pallet station $S_p$. The holdgate 60 is selectively raised and lowered in the sequence noted above by means including a limit switch 72 normally open when the platen 46 is at rest during loading of loaves at the accumulator station and which closes during cycling of the platen to complete a circuit to the holdgate actuator 62 thereby to lower the holdgate 60 during cycling of the platen to prevent movement of loaves to the accumulator station $S_a$.

During accumulation of the loaves L at the accumulator station $S_a$, a backup bar 70, which serves as a backstop, limits movement of the loaves L on the platen. This backup bar 70 is normally spring biased to a lowered position in the path of movement of the loaves and is adapted for retracting upward movement to permit movement of the platen outwardly when a group of loaves has accumulated at the accumulator station $S_a$ and the platen is cycled. To this end, the limit switch 72, which senses initial outward movement of the platen 46 from its retracted limit position, is connected to a solenoid control 74 which energizes solenoid control valve 75 to retract the backup bar 70 to its upper limit position during outward movement of the platen 46. When the platen 46 is fully extended, that is, in its outer position, sensing means in the form of an outer platen limit switch 76 is engaged by the platen 46 and through the solenoid control 74, solenoid control valve 75 is deenergized permitting backup bar 70 to return to its lowered limit position so that upon reverse movement of the platen 46, the backup bar 70 serves as a sweeper to eject the loaves from the platen so that the group G of loaves is deposited on the uppermost empty pallet P at the pallet station $S_p$.

When the platen 46 returns to its retracted limit position, a pallet loader 80 transfers the loaded pallet P to the elevator 18 at the transfer station $S_t$. To this end, there is provided a platen return sensor 82 which receives a signal from the platen upon its return to the retracted limit position and in turn effects actuation of a piston-cylinder 84 through actuator 83 for cycling the pallet loader 80 to transfer the filled pallet P from the pallet station $S_p$ to the elevator 18. The pallet loader 80 as best illustrated in FIGS 2-6 comprises a carriage 85 slidably supported in a framework 86 overlying the accumulator station $S_a$ of the conveyor and a head assembly 88 mounted at the forward end of the carriage 85. The head assembly 88, as illustrated, comprises a platform 87 having in the present instance, four pivotally mounted depending clamping arms 88a adapted to detachably engage the opposite side edge portions of the uppermost pallet P at the pallet station. The pallet loader 80 is adapted for actuation between a first rearward limit position wherein the clamping arms 88a engage a pallet P at the pallet station $S_p$ and a second forward limit position to deposit a loaded pallet P on the elevator 18 by means of the hydraulic piston-cylinder actuator 84 which cycles the pallet loader assembly on signal from the platen return sensor 82. In the present instance, means is provided for releasing the clamping arms 88a when the pallet loader moves to its outer limit position to release the loaded pallet and to pivot the clamping arms 88a to an operative position to engage an empty pallet P upon return of the pallet loader 80 to its inner limit position. To this end, as best illustrated in FIG. 4a, the clamping arms 88a at one side of the platform 87 are mounted at opposite ends of a shaft 89 and the clamping arms 88a on the opposite side of the platform 87 are mounted at opposite ends of a shaft 91. The shafts 89 and 91 are adapted to be rotated to pivot the clamping arms in the manner described above by means including an air cylinder 95 which actuates a rack 97 meshing with a spur gear 99 mounted on an actuator shaft 101 which in turn mounts miter gears at its opposite ends meshing with miter gears 105 and 107 on the shafts 89 and 91 respectively.

In the present instance, the pallets P are generally of rectangular shape and are positioned at the pallet station $S_p$ in a predetermined direction to receive the group G of loaves and must be rotated 90° for entry into the conventional racks. To this end, the platform 87 of the head assembly is pivotally mounted on the carriage 85 and upon actuation of the pallet loader 80 rotates a loaded pallet 90° during transfer from its rest position at the pallet station to the elevator 18 at the transfer station $S_t$. In the present instance this is accomplished by means of a rotary oscillating torque actuator 107 suitably synchronized with the pallet loader actuator.

In the present instance, a stack of pallets P is provided at the pallet station $S_p$ and suitable means is provided for presenting the uppermost pallet in a predetermined position to receive a group of loaves from the platen for engagement by the pallet loader for transfer to the elevator 18. To this end, the stack of pallets P is supported on a lift table 90 adapted for vertical up and down movement by means of a scissor-type linkage mechanism 92 and a hydraulic piston-cylinder actuator 94. Further, sensing means in the form of a microswitch 96 is provided which is normally engaged by the uppermost pallet P in the stack and which senses displacement of a loaded pallet P from the stack to signal the actuator 94 to raise the lift table 90 and present the next empty pallet to a predetermined level to be engaged by the clamping arms 88a of the pallet loader 80. By this arrangement, the uppermost pallet is always located at a predetermined height relative to the accumulator station $S_a$ to receive a group of loaves from the platen and at a selected height to be engaged by the pallet loader to convey the loaded pallet to the elevator in the manner described above. It is noted that the pallets P are supported on a dolly 109 and that when the stack on the dolly has been exhausted, the switch 96 signals the actuator 94 to return the lift table 90 to its lowermost position. The dolly 109 may be provided with wheels 111 which ride on a trackway 113 extending transversely of the conveyor so that when the lift table retracts to a lower limit position, the empty dolly 109 may be rolled away and a dolly having a new stack of pallets may be positioned over the lift table. This may be done manually or automatically.

Considering now the details of the transfer station $S_t$, the elevator 18 comprises an upright frame structure 100, and an elevator platform 102 mounted for up and down movement in a vertical direction through a predetermined cycle by suitable drive system including a motor 104 and a motor control circuit 106. The platform 102 mounts a pallet sensing switch 108. This switch 108 when it is engaged and closed by a loaded pallet positioned on the elevator by the pallet loader 80, initiates through the motor control circuit 106 movement of the platform 102 from its normal rest or starting position (see FIG. 2) to a position in registry with an empty tier in the stationary rack 20. When the platform 102 stops in registry with an empty tier in the stationary rack 20, the solenoid 110 for a piston-cylinder actuator 112 is energized through the motor control circuit to effect movement of the platform 102 to discharge the loaded pallet to the stationary rack. When the platform 102 has been emptied on the return stroke of the actuator 112, the motor control circuit 106 is signalled to return the platform to its rest position (see FIG. 2) to receive another loaded pallet.

The stationary rack 20, as best illustrated in FIGS. 8 and 9, comprises a support frame 130 having a plurality or tiers $T_s$, each tier $T_s$ being defined by a pair of spaced apart angle pieces 132 at opposite sides of the support frame 130. The stationary rack has an open load side to each of the tiers confronting and adjacent to the elevator 18 and an open discharge side confronting and aligned with the tiers $T_p$ of the portable rack 22. Each tier $T_s$ is preferably of a length to receive two pallets P end to end. On the load side of the stationary rack 20, there is provided at each tier location, a spring biased plunger 134 which normally is biased outwardly and is connected in series with a pair of pressure sensitive switches 133 and 137, a battery 139 and a relay coil 141 which sense the presence or absence of pallets P in each tier. By this arrangement, when a given tier is filled with a pair of pallets and the switches 133 and 137 are closed by the presence of the pallets, a circuit is completed through the solenoid 134a of the plunger 134 to cause it to retract. These plungers extend in the path of movement of a normally closed actuator switch 135 carried by the platform of the elevator 18. By this arrangement, when a loaded pallet is deposited on the platform of the elevator 18 and the elevator is cycled through the motor control circuit, the platform moves from its rest position until the arm of switch 135 engages a protruding plunger 134 which opens switch 135 and supplies signal to the motor control circuit, whereby the elevator is stopped in registry with the empty tier and the loaded pallet is discharged. A filled rack sensing circuit 145 is provided by connecting in series all of the normally open contacts 143 associated with the relay coils 141 so that when all of the tiers of the stationary rack are filled, all of the relay coils 141 are operated and the sensing circuit 145 is completed.

When all of the tiers of the stationary rack have been filled with loaded pallets in the manner described above, means is provided for discharging all of the loaded pallets P from the stationary rack 20 to the portable rack 22. The unloading means, as best illustrated in FIGS. 8 and 9, comprises a pair of upright clearing bars 150 and 152 at one side of the stationary rack 20 and a pair of upright clearing bars 160 and 162 at the opposite side of the stationary rack 20. The pairs of clearing bars are mounted for movement in an endless path through the rack on endless chains 154 and 164 respectively, the chains being suitably supported on sprockets and in the present instance actuatable from a common drive system including a motor 170 and a motor control relay 172. The clearing bars of each pair are located at diametrically opposed points on their respective chains so that in their normal rest position, one of the clearing bars of each pair confronts the discharge side of the tiers of the stationary rack to act as a bumper for pallets being loaded onto the rack and the other clearing bar of each pair is disposed outboard of the open side of the rack to permit insertion of loaded pallets into the tiers of the stationary rack 20. (See FIGS. 9 and 10.) When all of the tiers of the stationary rack have been filled, the clearing bars of each pair at the front end of the stationary rack move through the rack to displace the loaded pallets from the stationary rack 20 to the portable rack 22. To this end, there is provided in the present instance a control switch 176 which is operatively connected with the sensing circuit, the motor control relay 172 and a battery 173a.

Switch 176 is of the type having two switch contacts, an off contact 176a and an on contact 176b which are engaged during cycling of the clearing bars by a pair of lugs 173 and 175 (see FIG. 14.). As also illustrated therein, the switch 176 is connected in parallel with the filled rack sensing circuit 145. The battery 173a supplies control current to motor control relay 172 which in turn causes the motor 170 to operate to move the clearing bars through one cycle.

By this arrangement during filling of the stationary rack $S_r$ and before completion of the filled rack sensing circuit 145, the lug 175 engages the off contact of the switch 176 and hence, the motor 170 is shut down. Now when the rack sensing circuit 145 is completed by closing all of the relay coils 141, that is, when all of the tiers $T_s$ of the stationary rack are filled, the motor control relay 172 signals operation of the motor 170 to actuate the clearing bars through one complete cycle. After completion of the circuit and during initial movement of the clearing bars, the lug 175 disengages the off contact 176a and engages the on contact 176b of switch 176 so that switch 176 replaces the filled rack sensing circuit 145 to effect complete cycling of the clearing bars until the opposing contact 173 engages the off contact 176a of the switch 176.

Now after all of the loaded pallets have been moved into the portable rack, an operator simply hauls away the loaded rack and replaces it with an empty one.

Consider now briefly the operation of the apparatus and system of the present invention in connection with the handling of wrapped loaves of bread. As illustrated in FIG. 1, the wrapped loaves L are discharged from the wrapping machine 10 on a first discharge conveyor section 30 where the loaves are closely adjacent one another in the manner illustrated. The loaves L then pass to the second discharge conveyor section 32 which is moving at a faster linear speed to space the loaves L and facilitate grouping thereof at the accumulator station $S_a$. The loaves L are then directed into the accumulator station $S_a$ by a pair of diverter bars 34 which are normally biased in the direction indicated by solid lines in FIG. 1 whereby the loaves are directed first into the row $R_1$ at the accumulator station. When five loaves have accumulated in row $R_1$, AND circuit 40 is actuated producing an output signal passing through switch $S_1$ to energize solenoid actuator 44 mechanically ganged to the diverter bars 34 to displace the diverter bars angularly to the position shown in broken lines whereby loaves are directed into the row $R_2$ at the accumulator station $S_a$. When five loaves have accumulated in the row $R_2$, the AND circuit 42 is actuated producing an output signal to open switch $S_1$ to de-energize the solenoid actuator 44 to permit return of the diverter bars 34 to their original position in alignment with the row $R_1$ of the accumulator station.

Actuation of AND circuit 42 also signals the platen actuator 56 to cycle the platen 46 from its retracted position to its extended position and back to its retracted limit position thereby to deliver a group G of loaves to an empty pallet P at the pallet station $S_p$. During initial movement of the platen 46, the limit switch $S_2$ is engaged to signal the hold gate actuator 62 to lower holdgate 60 preventing flow of loaves into the accumulator station $S_a$ during cycling of the platen 46 and to raise backup bar 70 to permit the platen to pass. Now when the platen 46 reaches its outer limit position, limit switch 76 is engaged to lower backup bar 70 so that on retract movement of the platen 46 the group of loaves is deposited on an empty pallet P at the pallet station. When the platen returns to its retracted limit position, the platen return sensor 82 signals the actuator 84 to cycle pallet loader 80 to deliver the loaded pallet to the platform of the elevator at the transfer station $S_t$. Return of the platen 46 also raises holdgate 60 to permit flow of loaves to the accumulator station and formation of another group G of loaves. It is noted that as the loaded pallet is removed, the sensing switch 96 effects upward movement of the lift table 90 to present the next empty pallet to a predetermined level to be engaged by the clamping arms of the load carriage on its retract stroke. The head assembly of the load carriage during cycling thereof rotates the pallet 90° to orient the pallet for introduction into the stationary rack and as explained above, the clamping arms automatically disengage the loaded pallet at the transfer station and re-engage the pallet when it returns to the pallet station $S_p$.

When a loaded pallet is delivered to the elevator platform which is normally at its rest position shown in FIG. 1, the pallet sensing switch 108 initiates through the motor control circuit 106 cycling of the platform 102 through a predetermined cycle. During movement of the platform, when the platform sensing switch 135 engages the first protruding plunger 134, the motor control circuit 106 is signalled to stop the elevator in registry with an empty tier to discharge the empty pallet. At this point, the motor control circuit also effects energization of the solenoid 110 for the actuator 112 to discharge the loaded pallet to the empty tier. Thereafter, the elevator platform is returned to its original rest position to receive another loaded pallet from the pallet loader. After all of the tiers of the stationary rack have been completely filled, the rack sensing circuit 145 is completed which through the motor control relay 172 operates the motor to cycle the clearing bars to move all of the loaded pallets from the stationary rack 20 to the portable rack 22. An operator may then move the filled portable rack 22 to another location and replace it with another one.

Figure 12:
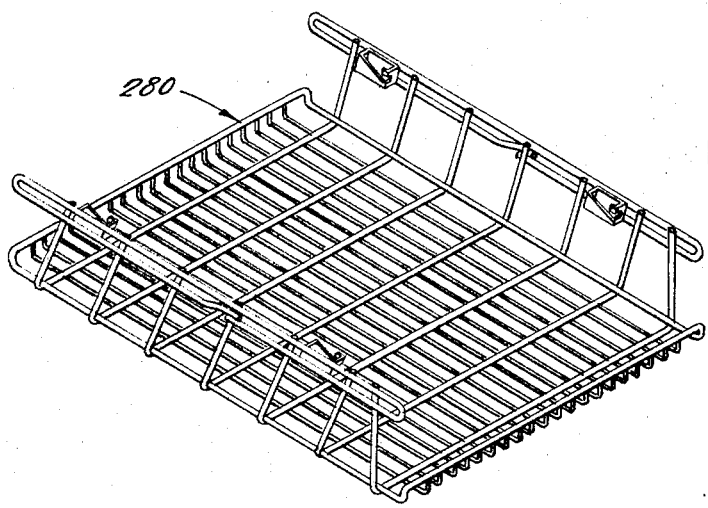
FIG. 12 is a perspective view of a stacking rack employed in the system shown in FIG. 11.

In some instances it may be desirable to reorient the loaves of bread coming from the wrapping station so that they are disposed parallel to the direction of movement of the conveyor. To this end there may be provided a turn-around mechanism 200, which as illustrated in FIGS. 1 and 2, overlies the conveyor section 32 and is operable automatically to reorient the loaves of bread moving on the conveyor. In this embodiment of the invention, the group of loaves is adapted to be stacked in wire racks 280 of the type illustrated in FIG. 12. These racks when empty may be nested inside one another and, in the present instance, are supported on a lift table at a rack station $S_{r-1}$ adjacent the accumulator station $S_{a-1}$. As in the previously described embodiment, a sensing switch and lift-table arrangement is provided for selectively maintaining the uppermost rack of the stack at a predetermined level relative to the accumulator station.

In the present instance means is provided for transferring a loaded rack from the rack station $S_{r-1}$ to a stacking station $S_s$ wherein the loaded racks are stacked one on top of another on a dolly so that they may be moved away to another location. This mechanism comprises an upright frame structure 300 supporting a transfer assembly 301 adapted for up and down movement in trackways 303 in the frame structure by means including a piston-cylinder actuator 305. The transfer assembly includes an outwardly projecting boom 304 which supports a carriage 306 having actuator means including a piston-cylinder actuator 308 for moving the carriage along the boom. The carriage mounts two pairs of clamping arms 310 which are adapted to detachably engage portions of the rack and move the same from the rack station $S_{r-1}$ to the stacking station $S_s$.

There is shown in FIG. 11 another embodiment of apparatus in accordance with the present invention for handling articles such as loaves of bread. As illustrated in FIG. 11, this embodiment of the invention includes an accumulation station $S_{a-1}$ at one end of a discharge conveyor section 232 which receives wrapped loaves of bread from an automatic wrapping machine (not shown). The details and means for accumulating loaves at the accumulator station may be identical to that described above. Thus, in the present instance, there is provided a movable platen 246 having platen actuator means including a piston-cylinder actuator 248a, holdgate 247 for preventing flow of loaves L' to the accumulator station during cycling of the platen 246 and a backup bar 270 which, in the lowered position serves as a backstop during accumulation of loaves and during cycling of the platen is selectively raised and lowered to sweep the loaves from the platen.

Suitable means are provided for synchronizing and timing the operation of the transfer assembly to transfer loaded racks from the rack station $S_{r-1}$ to the stacking station $S_s$. More particularly, assume that the transfer assembly is in the position shown with the clamping arms 310 engaging the top empty rack 280 at the rack station $S_{r-1}$. Now when the platen 246 delivers a group of loaves to an empty rack at the rack station $S_{r-1}$ the transfer assembly 301 is raised in the trackway 303 by the actuator 305 to its uppermost limit position adjacent the top of the frame structure. During this movement of the transfer assembly, the carriage 306 is moved outwardly along the boom 304 by means of the actuator 308 to a position overlying the uppermost filled rack at the stacking station $S_s$. The actuator 305 then reverses movement of the transfer mechanism so that it is actuated downwardly along the trackway 303 until the filled rack carried by the clamping arms engages the uppermost filled rack at the stacking station $S_s$. The clamping arms then disengage the filled rack and the transfer mechanism 301 and carriage 306 are cycled back to their initial starting position.

I claim:

1. In apparatus for handling articles such as loaves of bread discharged from the discharge conveyor of an automatic packaging machine comprising an accumulator station including a movable platen, orientation means for directing loaves on to the platen in groups of a given number and orientation, a carrier means station adjacent the accumulator station including at least one carrier means, means for cycling the platen to deliver a group of loaves to said one carrier means at the carrier means station, a transfer elevator, a stationary rack adjacent the transfer elevator, transfer means for transferring a filled carrier means to the transfer elevator, said transfer elevator including sensing means whereby a filled carrier means is delivered to an empty tier of the stationary rack, a portable rack and clearing means for transferring all of the filled carrier means from the stationary rack to the portable rack when all of the tiers have been filled.

2. In apparatus as claimed in claim 1 including means for cycling said platen between an inner limit position during accumulation of loaves at said accumulator station and an outer limit position overlying the uppermost empty pallet at the pallet station.

3. In apparatus as claimed in claim 2 including a holdgate at the entrance end of the accumulator station operable between a raised position out of the path of movement of the loaves during formation of a group at the accumulator station and a lowered position blocking movement of loaves into the accumulator station during cycling of the platen between limit positions.

4. In apparatus as claimed in claim 2 including a backup bar and means for selectively controlling positioning of the backup bar between a lowered position and a raised position, said backup bar being in a lowered position during accumulation of loaves at the accumulator station, a raised position during movement of the platen from its inner limit position to its outer limit position and a lowered position during retracting movement of the platen to sweep the group of loaves from the platen so that they are deposited on the upper most empty pallet at the pallet station.

5. In apparatus as claimed in claim 1 including a transfer elevator disposed between said pallet station and said stationary rack and wherein said transfer means comprises a load carriage having a platform and a plurality of pivotally mounted clamping arms adapted to engage a pallet at the pallet station and release the filled pallet when it is filled to the elevator.

6. In apparatus as claimed in claim 5 including control means for effecting cycling of said elevator platform from a rest position to a position in registry with an empty tier in said stationary rack and including actuator means for discharging a filled pallet on the platform when said elevator is in registry with said empty tier.

7. In apparatus as claimed in claim 1 wherein said clearing means comprises at least one upright clearing bar mounted for movement in an endless path through all the tiers of the stationary rack and clearing bar control means operable to cycle said clearing bar through said rack when all of the tiers of said stationary rack have been filled with pallets.

8. In apparatus for handling articles such as loaves of bread discharged from the discharge conveyor of an automatic packaging machine, comprising an accumulator station including a movable platen, orientation means for directing loaves on to the platen in a group of given number and orientation, a pallet station adjacent the accumulator station including at least one pallet, means for cycling the platen to deliver a group of loaves to said one pallet at the pallet station, a stationary rack, transfer means for transferring a filled pallet to an empty tier of the stationary rack, a portable rack and clearing means for transferring all of the filled pallets from the stationary rack to the portable rack when all of the tiers have been filled, a transfer elevator disposed between said pallet station and said stationary rack, said transfer means comprising a load carriage having a platform and plurality of pivotally mounted clamp arms adapted to engage a pallet at pallet station and release the filled pallet when it is delivered to the elevator.

References Cited

UNITED STATES PATENTS

| 1,903,102 | 3/1933 | Farley | 214—166 |
| 2,510,573 | 6/1950 | Gray | 214—166 |
| 2,669,342 | 2/1954 | Weal | 198—164 |
| 2,727,345 | 12/1955 | Schoppee | 198—164 |
| 2,869,739 | 1/1959 | Davis | 214—16.4 |
| 2,956,696 | 10/1960 | Drakengren | 214—16.4 XR |
| 3,085,696 | 4/1963 | Stainforth et al. | |
| 3,195,739 | 7/1965 | Hein et al. | |
| 3,203,560 | 8/1965 | Janzer | 214—714 XR |
| 3,263,827 | 8/1966 | Varrinder. | |
| 3,315,785 | 4/1967 | Shiffer. | |

FOREIGN PATENTS 1,244,584  9/1960  France.

GERALD M. FORLENZA, *Primary Examiner.*

RAYMOND B. JOHNSON, *Assistant Examiner.*

U.S. Cl. X.R.

214—6, 16.6